United States Patent
Stubblefiled et al.

(10) Patent No.: US 9,846,954 B2
(45) Date of Patent: Dec. 19, 2017

(54) TREAD WITH ULTRA EFFICIENT VULCANIZATION SYSTEM

(75) Inventors: Ramond Stubblefiled, Greenville, SC (US); Xavier Saintigny, Greenville, SC (US); William Marshall Thompson, Simpsonville, SC (US); Elizabeth L Holaling, Piedmont, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 948 days.

(21) Appl. No.: 14/345,198

(22) PCT Filed: Sep. 14, 2012

(86) PCT No.: PCT/US2012/055531
§ 371 (c)(1),
(2), (4) Date: Mar. 14, 2014

(87) PCT Pub. No.: WO2013/040425
PCT Pub. Date: Mar. 21, 2013

(65) Prior Publication Data
US 2014/0347377 A1    Nov. 27, 2014

Related U.S. Application Data

(60) Provisional application No. 61/534,867, filed on Sep. 14, 2011.

(51) Int. Cl.
| | |
|---|---|
| *C08L 9/00* | (2006.01) |
| *G06T 11/60* | (2006.01) |
| *G06T 1/20* | (2006.01) |
| *G06F 3/14* | (2006.01) |
| *C08K 3/36* | (2006.01) |
| *C08K 5/00* | (2006.01) |
| *G09G 5/14* | (2006.01) |
| *G06F 9/44* | (2006.01) |

(52) U.S. Cl.
CPC ............ *G06T 11/60* (2013.01); *G06F 3/1454* (2013.01); *G06T 1/20* (2013.01); *C08K 3/36* (2013.01); *C08K 5/0016* (2013.01); *C08K 5/0025* (2013.01); *C08L 9/00* (2013.01); *G06F 9/4443* (2013.01); *G06T 2201/00* (2013.01); *G06T 2210/21* (2013.01); *G09G 5/14* (2013.01); *G09G 2340/12* (2013.01); *G09G 2358/00* (2013.01); *G09G 2370/022* (2013.01)

(58) Field of Classification Search
CPC ...... C08K 5/0016; C08K 5/0025; C08K 3/36; C08L 9/00
See application file for complete search history.

(56) References Cited

U.S. PATENT DOCUMENTS

| | | | | |
|---|---|---|---|---|
| 7,084,228 B2* | 8/2006 | Labauze | ............. | C08K 5/0016 152/209.1 |
| 7,253,225 B2* | 8/2007 | Labauze | ............. | B60C 1/0016 524/313 |
| 7,335,692 B2* | 2/2008 | Vasseur | ................ | B60C 1/0016 524/312 |
| 7,629,408 B2* | 12/2009 | Cambon | .............. | B60C 1/0016 524/430 |
| 8,178,605 B2* | 5/2012 | Lopitaux | .............. | B60C 1/0016 524/306 |
| 8,759,438 B2* | 6/2014 | Lopez | .................. | B60C 1/0016 524/502 |
| 2004/0092644 A1* | 5/2004 | Labauze | .............. | B60C 1/0016 524/492 |
| 2004/0122157 A1* | 6/2004 | Labauze | .............. | B60C 1/0016 524/487 |
| 2008/0121324 A1 | 5/2008 | Cambon et al. | | |
| 2010/0018621 A1 | 1/2010 | Thompson | | |
| 2010/0204358 A1 | 8/2010 | Lopitaux | | |
| 2010/0256275 A1 | 10/2010 | Lopitaux | | |
| 2011/0009547 A1 | 1/2011 | Araujo Da Silva et al. | | |
| 2013/0096248 A1* | 4/2013 | Thompson | ............ | B60C 1/0016 524/526 |
| 2014/0127617 A1 | 5/2014 | Zhou et al. | | |
| 2014/0251519 A1 | 9/2014 | Piffard et al. | | |
| 2014/0371346 A1* | 12/2014 | Saintigny | .............. | B60C 1/0016 523/156 |

FOREIGN PATENT DOCUMENTS

| | | | | |
|---|---|---|---|---|
| JP | 2001348461 A | 12/2001 | | |
| JP | 2003213044 A | 7/2003 | | |
| WO | 2011075121 A1 | 6/2011 | | |
| WO | WO 2012/012133 A1 * | 1/2012 | ........... | C08F 236/06 |
| WO | 2013039498 A1 | 3/2013 | | |

OTHER PUBLICATIONS

International Search Report and Written Opinion, dated Nov. 21, 2012.

* cited by examiner

*Primary Examiner* — Rip A Lee
(74) *Attorney, Agent, or Firm* — Frank J. Campigotto

(57) ABSTRACT

Tire treads having improved traction properties while surprisingly still maintaining good material cohesion properties, the tire treads comprising a rubber composition based upon a highly unsaturated diene elastomer and between 95 phr and 160 phr of an inorganic reinforcing filler. The composition may further include between 60 phr and 130 phr of a plasticizing system made up of a plasticizing resin having a Tg of at least 25° C. and a plasticizing liquid. The rubber composition is cured with an ultra-efficient sulfur curing system having a sulfur to accelerator weight ratio adjusted between 0.02 and 0.2 to provide the rubber composition with an MA300/G* ratio of greater than 1.7, wherein the elongation modulus MA300 at 300% is measured at 23° C. and the shear modulus G* is measured at 60° C.

15 Claims, No Drawings

TREAD WITH ULTRA EFFICIENT VULCANIZATION SYSTEM

BACKGROUND OF THE INVENTION

Field of the Invention

This invention relates generally to passenger and light truck tires and more particularly, to treads and materials from which they are made.

Description of the Related Art

It is known in the industry that tire designers must often compromise on certain characteristics of the tires they are designing. Changing a tire design to improve one characteristic of the tire will often result in a compromise; i.e., an offsetting decline in another tire characteristic. One such comprise exists between tire wear and wet braking. Tire wear may be improved by increasing the amount of polybutadiene blended into the tread's rubber composition. However, increasing the polybutadiene content in the tread's rubber composition typically results in a loss of the wet braking performance that is known to be improved, for example, by decreasing the polybutadiene content of the tire tread.

Tire designers and those conducting research in the tire industry search for materials and tire structures that can break some of the known compromises. It would be desirable to provide new tire designs that break other known compromises.

SUMMARY OF THE INVENTION

Particular embodiments of the present invention include tire treads having improved traction properties while surprisingly still maintaining good material cohesion properties. In a tread for a tire, the tread comprising a rubber composition that is based upon a cross-linkable elastomer composition, the cross-linkable elastomer composition comprises, per 100 parts by weight of rubber (phr), a highly unsaturated diene elastomer and between 95 phr and 160 phr of an inorganic reinforcing filler. The composition may further include between 60 phr and 130 phr of a plasticizing system comprising a plasticizing resin having a Tg of at least 25° C. and a plasticizing liquid. The rubber composition is cured with an ultra-efficient sulfur curing system having a sulfur to accelerator weight ratio adjusted between 0.02 and 0.2 to provide the rubber composition with an MA300/G* ratio of greater than 1.7, wherein the elongation modulus MA300 at 300% is measured at 23° C. and the shear modulus G* is measured at 60° C.

In particular embodiments, the rubber composition has a glass transition temperature of between −35° C. and 0° C.

Exemplary embodiments provide that the plasticizing system may include between 5 phr and 70 phr of the plasticizing liquid and further, that the plasticizing system may include between 5 phr and 125 phr of the plasticizing resin.

The foregoing and other objects, features and advantages of the invention will be apparent from the following more detailed descriptions of particular embodiments of the invention.

DETAILED DESCRIPTION OF PARTICULAR EMBODIMENTS

Particular embodiments of the present invention include tire treads having improved traction properties while surprisingly still maintaining good material cohesion properties. Such tires are particularly useful as all-weather tires and/or summer tires for passenger cars and/or light trucks.

The improved traction may be achieved by forming treads from a rubber composition that includes the high loading of reinforcement filler as well as the high loadings of a plasticizing system. With such high loadings of filler and plasticizer, a compromise is often engaged in that the traction of the tire is improved to the detriment of the material cohesion.

When material cohesion of a tread is reduced, chunking of the tread may occur with losses of large amounts or chunks of the tread material during operation of the tire. In some cases the chunking becomes so great that the tire is no longer useable after only a short period of its operation.

To overcome this compromise, particular embodiments of the present invention include an ultra-efficient sulfur curing system. The inventors have surprisingly discovered that such a sulfur curing system can be adjusted to provide improved material cohesion properties to rubber compositions having a high loading of inorganic reinforcing filler and plasticizer. The adjustment is made to provide a cured rubber composition having an elongation to shear modulus ratio, defined as MA300:G*60, of greater than 1.7, wherein MA300 is the elongation modulus at 300% measured at 23° C. and the G*60 is the shear modulus measured at 60° C.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

As is known generally, a tire tread is the road-contacting portion of a vehicle tire that extends circumferentially about the tire. It is designed to provide the handling characteristics required by the vehicle; e.g., traction, dry braking, wet braking, cornering and so forth—all being preferably provided with a minimum amount of noise being generated and at a low rolling resistance.

Treads of the type that are disclosed herein include tread elements that are the structural features of the tread that contact the ground. Such structural features may be of any type or shape, examples of which include tread blocks and tread ribs. Tread blocks have a perimeter defined by one or more grooves that create an isolated structure in the tread while a rib runs substantially in the longitudinal (circumferential) direction and is not interrupted by any grooves that run in the substantially lateral direction or any other grooves that are oblique thereto.

The radially outermost faces of these tread elements make up the contact surface of the tire tread—the actual surface area of the tire tread that is adapted for making contact with the road as the tire rotates. The total contact surface of the tire tread is therefore the total surface area of all the radially outermost faces of the tread elements that are adapted for making contact with the road.

Particular embodiments of the present invention include a diene elastomer blended into the rubber composition from which treads are manufactured. The diene elastomers or rubbers that are useful for such rubber compositions as disclosed herein are understood to be those elastomers resulting at least in part, i.e., a homopolymer or a copolymer, from diene monomers, i.e., monomers having two double carbon-carbon bonds, whether conjugated or not.

These diene elastomers may be classified as either "essentially unsaturated" diene elastomers or "essentially saturated" diene elastomers. As used herein, essentially unsaturated diene elastomers are diene elastomers resulting at least in part from conjugated diene monomers, the essentially unsaturated diene elastomers having a content of such members or units of diene origin (conjugated dienes) that is at least 15 mol. %. Within the category of essentially unsaturated diene elastomers are highly unsaturated diene elastomers, which are diene elastomers having a content of units of diene origin (conjugated diene) that is greater than 50 mol. %.

Those diene elastomers that do not fall into the definition of being essentially unsaturated are, therefore, the essentially saturated diene elastomers. Such elastomers include, for example, butyl rubbers and copolymers of dienes and of alpha-olefins of the EPDM type. These diene elastomers have low or very low content of units of diene origin (conjugated dienes), such content being less than 15 mol. %.

The elastomers useful in the present invention may have any microstructure, such microstructure being a function of the polymerization conditions used, in particular of the presence or absence of a modifying and/or randomizing agent and the quantities of modifying and/or randomizing agent used. The elastomers may, for example, be block, random, sequential or micro-sequential elastomers, and may be prepared in dispersion or in solution; they may be coupled and/or starred or alternatively functionalized with a coupling and/or starring or functionalizing agent.

Functionalized rubbers, i.e., those appended with active moieties, are well known in the industry. The backbone or the branch ends of the elastomers may be functionalized by attaching these active moieties to the ends of the chains or to the backbone of the polymer Examples of functionalized elastomers include silanol or polysiloxane end-functionalized elastomers, examples of which may be found in U.S. Pat. No. 6,013,718, issued Jan. 11, 2000, which is hereby fully incorporated by reference. Other examples of functionalized elastomers include those having alkoxysilane groups as described in U.S. Pat. No. 5,977,238, carboxylic groups as described in U.S. Pat. No. 6,815,473 or polyether groups as described in U.S. Pat. No. 6,503,973, all these cited patents being incorporated herein by reference.

Examples of suitable diene elastomers include polybutadienes, particularly those having a content of 1,2-units of between 4 mol. % and 80 mol. % or those having a cis-1,4 content of more than 80 mol. %. Also included are polyisoprenes and butadiene/isoprene copolymers, particularly those having an isoprene content of between 5 wt. % and 90 wt. % and a glass transition temperature (Tg, measured in accordance with ASTM D3418) of −40° C. to −80° C.

Particular embodiments of the present invention include treads and tires having such treads manufactured from such rubber composition that includes at least 50 phr of SBR, the remainder of the rubber component being a second diene rubber. SBR is a copolymer of styrene and butadiene and is one of the most commonly used rubbers. It is typically manufactured by one of two processes—an emulsion process producing E-SBR and a solution process producing S-SBR. Particular embodiments of the present invention contemplate utilizing S-SBR, E-SBR or combinations thereof and may also, in some embodiments, utilize such materials having a low Tg, i.e., a Tg that is less than −50° C.

The microstructure of SBR is typically described in terms of the amount of bound styrene and the form of the butadiene portion of the polymer. A typical SBR that is often suitable for use in tires is around 25 wt. % bound styrene. Materials having a very high content of bound styrene, e.g., around 80 wt. %, are identified as high styrene resins and are not suitable as an elastomer for manufacturing treads. Particular embodiments of the present invention may utilize an SBR having a bound styrene content of between 3 wt. % and 40 wt. % or alternatively between 3 wt. % and 30 wt. %, between 3 wt. % and 25 wt. % or between 15 wt. % and 30 wt. % bound styrene.

Because of the double bond present in the butadiene portion of the SBR, the butadiene portion is made up of three forms: cis-1,4, trans-1, 4 and vinyl-1,2. SBR materials suitable for use as the low Tg SBR may be described as having a vinyl-1,2-bond content of between 4 mol. % and 30 mol. % or alternatively, between 4 mol. % and 25 mol. % or between 4 mol. % and 20 mol. %. Low Tg SBR materials include those having a glass transition temperature of between −100° C. and −50° C. or alternatively, between −100° C. and −55° C., between −100° C. and −60° C. or between −90° C. and −50° C. The glass transition temperature of such materials may also range between greater than −80° C. and −55° C., between −75° C. and −60° C. or between −75° C. and −65° C. Glass transition temperatures for the low Tg SBR and other elastomers are determined by differential scanning calorimetry (DSC) according to ASTM E1356.

It is noted that while low Tg SBR may be desired for particular embodiments of the present invention, the invention is not so limited and other particular embodiments of the present invention include the full range of suitable SBR materials. Particular embodiments of the present invention may include the SBR material in amounts of at least 50 phr or alternatively, at least 60 phr, at least 70 phr, at least 80 phr, at least 90 phr or 100 phr of the SBR. Of course other embodiments may include SBR blended into the rubber composition at amounts less than 50 phr, including none.

Polybutadienes that have glass transition temperatures in the same ranges as the low Tg SBR materials described above may also be utilized similarly to the low Tg SBR. The glass transition temperatures of polybutadiene may be adjusted by varying the vinyl content of the polymer using methods that are well known in the art. Particular embodiments of the rubber compositions disclosed herein may include greater than 90 phr or alternatively, greater than 95 phr or 100 phr of a low Tg SBR, a low Tg polybutadiene, i.e., a polybutadiene having the same glass transition temperature range as defined above for a low Tg SBR, or combinations thereof.

In summary, suitable diene elastomers for particular embodiments of the present invention include one or more highly unsaturated diene elastomers such as polybutadienes (BR), polyisoprenes (IR), natural rubber (NR), butadiene copolymers, isoprene copolymers and mixtures of these elastomers. Such copolymers include butadiene/styrene copolymers (SBR), isoprene/butadiene copolymers (BIR), isoprene/styrene copolymers (SIR) and isoprene/butadiene/styrene copolymers (SBIR). Suitable elastomers may also include any of these elastomers being functionalized elastomers as mentioned above.

As such, the diene elastomer included in particular embodiments of the present invention may be one diene elastomer or a mixture of several diene elastomers. The diene elastomer may further be selected from the highly unsaturated diene elastomers, the essentially unsaturated diene elastomers, the essentially saturated diene elastomers or combinations thereof. There are embodiments that include only highly unsaturated diene elastomers as the elastomer component while other embodiments include at least a majority, or alternatively at least 80 phr or at least 90 phr of the elastomer component being a highly unsaturated diene elastomer.

In addition to the rubber, the rubber composition disclosed herein may further include reinforcing filler. Reinforcing fillers are added to rubber compositions to, inter alia, improve their tensile strength and wear resistance. Particular embodiments of the present invention include treads that are made of a rubber composition that includes high loadings of inorganic reinforcing fillers such as silica, with which a coupling agent is typically associated.

Carbon black, although a useful reinforcing filler in many tire applications, is explicitly excluded from the useful rubber compositions disclosed herein except, for some embodiments, very small quantities that may be included to provide coloring (black) to the tire composition and/or UV protection. Such benefits may be obtained by adding at least 0.5 phr but no more than 20 phr of carbon black or alternatively, less than 10 phr, less than 5 phr or between 0.5 phr and 10 phr of carbon black.

Inorganic reinforcing fillers include any inorganic or mineral fillers, whatever its color or origin (natural or synthetic), that are capable without any other means, other than an intermediate coupling agent, or reinforcing a rubber composition intended for the manufacture of tires. Such inorganic reinforcing fillers can replace conventional tire-grade carbon blacks, in whole or in part, in a rubber composition intended for the manufacture of tires. Typically such fillers may be characterized as having the presence of hydroxyl (—OH) groups on its surface.

Inorganic reinforcing fillers may take many useful forms including, for example, as powder, microbeads, granules, balls and/or any other suitable form as well as mixtures thereof. Examples of suitable inorganic reinforcing fillers include mineral fillers of the siliceous type, such as silica ($SiO_2$), of the aluminous type, such as alumina ($AlO_3$) or combinations thereof.

Useful silica reinforcing fillers known in the art include fumed, precipitated and/or highly dispersible silica (known as "HD" silica). Examples of highly dispersible silicas include Ultrasil 7000 and Ultrasil 7005 from Degussa, the silicas Zeosil 1165MP, 1135MP and 1115MP from Rhodia, the silica Hi-Sil EZ150G from PPG and the silicas Zeopol 8715, 8745 and 8755 from Huber. In particular embodiments, the silica may have a BET surface area, for example, of between 60 $m^2/g$ and 250 $m^2/g$ or alternatively between 80 $m^2/g$ and 230 $m^2/g$.

Examples of useful reinforcing aluminas are the aluminas Baikalox A125 or CR125 from Baikowski, APA-100RDX from Condea, Aluminoxid C from Degussa or AKP-G015 from Sumitomo Chemicals.

For coupling the inorganic reinforcing filler to the diene elastomer, a coupling agent that is at least bifunctional provides a sufficient chemical and/or physical connection between the inorganic reinforcement filler and the diene elastomer. Examples of such coupling agents include bifunctional organosilanes or polyorganosiloxanes. Such coupling agents and their use are well known in the art. The coupling agent may optionally be grafted beforehand onto the diene elastomer or onto the inorganic reinforcing filler as is known. Otherwise it may be mixed into the rubber composition in its free or non-grafted state. One useful coupling agent is X 50-S, a 50-50 blend by weight of Si69 (the active ingredient) and N330 carbon black, available from Evonik Degussa.

In the rubber compositions according to the invention, the coupling agent may be included at any suitable amount for the given application, examples of which are between 2 phr and 15 phr or alternatively, between 2 phr and 12 phr or between 3 phr and 10 phr. It is generally desirable to minimize its use. In particular embodiments, the amount of coupling agent may represent between 0.5 and 15 wt. % relative to the total weight of the silica filler. In the case for example of tire treads for passenger vehicles, the coupling agent may be less than 12 wt. % or even less than 10 wt. % or 8 wt. % relative to the total weight of the silica filler.

In particular embodiments, the amount of inorganic reinforcing filler is included in the rubber compositions disclosed herein at a fairly high loading for such tread applications because it is the high loading, coupled with the use of the plasticizing system to adjust the rigidity of the rubber composition, that provides the desired characteristics of the treads and tires of the present invention. Indeed, the amount of inorganic filler added to the rubber compositions may include between 90 phr and 160 phr of the inorganic filler or alternatively, between 95 phr and 160 phr, between 100 phr and 160 phr, between 110 phr and 150 phr or between 115 phr and 150 phr of the inorganic filler.

As noted above, particular embodiments of the present invention further include a plasticizing system that includes both a high Tg resin and a plasticizing liquid. The plasticizing system may provide both an improvement to the processability of the rubber mix and/or a means for adjusting the rubber composition's glass transition temperature and/or its rigidity. In particular embodiments, an effective amount of the plasticizing system is added to the rubber composition to adjust the shear modulus G* measured at 60° C. to between 0.4 MPa and 1.4 MPa or alternatively, between 0.4 MPa and 1.0 MPa. Such measurements are made in accordance with ASTM D5992-96. Other embodiments may include the shear modulus G* measured at 60° C. of between 0.5 MPa and 1.0 MPa, between 0.6 MPa and 0.9 MPa, between 0.5 MPa and 0.8 MPa or between 0.4 MPa and 0.8 MPa. In particular embodiments, effective amounts of the plasticizing system may be, for example, between 60 phr and 130 phr or alternatively between 70 phr and 120 phr, between 70 phr and 110 phr, between 80 phr and 120 phr or between 90 phr and 110 phr.

Suitable plasticizing liquids may include any liquid known for its plasticizing properties with diene elastomers. At room temperature (23° C.), these liquid plasticizers or these oils of varying viscosity are liquid as opposed to the resins that are solid. Examples include those derived from petroleum stocks, those having a vegetable base and combinations thereof. Examples of oils that are petroleum based include aromatic oils, paraffinic oils, naphthenic oils, MES oils, TDAE oils and so forth as known in the industry. Also known are liquid diene polymers, the polyolefin oils, ether plasticizers, ester plasticizers, phosphate plasticizers, sulfonate plasticizers and combinations of liquid plasticizers.

Examples of suitable vegetable oils include sunflower oil, soybean oil, safflower oil, corn oil, linseed oil and cotton seed oil. These oils and other such vegetable oils may be used singularly or in combination. In some embodiments, sunflower oil having a high oleic acid content (at least 70 weight percent or alternatively, at least 80 weight percent) is useful, an example being AGRI-PURE 80, available from Cargill with offices in Minneapolis, Minn. In particular embodiments of the present invention, the selection of a suitable plasticizing liquid is limited to a vegetable oil having a high oleic acid content.

The amount of plasticizing liquid useful in any particular embodiment of the present invention depends upon the particular circumstances and the desired result. In general, for example, the plasticizing liquid may be present in the rubber composition in an amount of between 5 phr and 70 phr or alternatively, between 10 phr and 60 phr, between 10 phr and 50 phr, between 5 phr and 40 phr or between 10 phr and 40 phr of the plasticizing liquid.

A plasticizing hydrocarbon resin is a hydrocarbon compound that is solid at ambient temperature (e.g., 23° C.) as opposed to a liquid plasticizing compound, such as a plasticizing oil. Additionally a plasticizing hydrocarbon resin is compatible, i.e., miscible, with the rubber composition with which the resin is mixed at a concentration that allows the resin to act as a true plasticizing agent, e.g., at a concentration that is typically at least 5 phr (parts per hundred parts rubber by weight).

Plasticizing hydrocarbon resins are polymers that can be aliphatic, aromatic or combinations of these types, meaning that the polymeric base of the resin may be formed from aliphatic and/or aromatic monomers. These resins can be natural or synthetic materials and can be petroleum based, in which case the resins may be called petroleum plasticizing resins, or based on plant materials. In particular embodiments, although not limiting the invention, these resins may contain essentially only hydrogen and carbon atoms.

The plasticizing hydrocarbon resins useful in particular embodiment of the present invention include those that are homopolymers or copolymers of cyclopentadiene (CPD) or dicyclopentadiene (DCPD), homopolymers or copolymers of terpene, homopolymers or copolymers of $C_5$ cut and mixtures thereof.

Such copolymer plasticizing hydrocarbon resins as discussed generally above may include, for example, resins made up of copolymers of (D)CPD/vinyl-aromatic, of (D)CPD/terpene, of (D)CPD/$C_5$ cut, of terpene/vinyl-aromatic, of $C_5$ cut/vinyl-aromatic and of combinations thereof.

Terpene monomers useful for the terpene homopolymer and copolymer resins include alpha-pinene, beta-pinene and limonene. Particular embodiments include polymers of the limonene monomers that include three isomers: the L-limonene (laevorotatory enantiomer), the D-limonene (dextrorotatory enantiomer), or even the dipentene, a racemic mixture of the dextrorotatory and laevorotatory enantiomers.

Examples of vinyl aromatic monomers include styrene, alpha-methylstyrene, ortho-, meta-, para-methylstyrene, vinyl-toluene, para-tertiobutylstyrene, methoxystyrenes, chloro-styrenes, vinyl-mesitylene, divinylbenzene, vinyl-naphthalene, any vinyl-aromatic monomer coming from the $C_9$ cut (or, more generally, from a $C_8$ to $C_{10}$ cut). Particular embodiments that include a vinyl-aromatic copolymer include the vinyl-aromatic in the minority monomer, expressed in molar fraction, in the copolymer.

Particular embodiments of the present invention include as the plasticizing hydrocarbon resin the (D)CPD homopolymer resins, the (D)CPD/styrene copolymer resins, the polylimonene resins, the limonene/styrene copolymer resins, the limonene/D(CPD) copolymer resins, $C_5$ cut/styrene copolymer resins, $C_5$ cut/$C_9$ cut copolymer resins, and mixtures thereof.

Commercially available plasticizing resins that include terpene resins suitable for use in the present invention include a polyalphapinene resin marketed under the name Resin R2495 by Hercules Inc. of Wilmington, Del. Resin R2495 has a molecular weight of about 932, a softening point of about 135° C. and a glass transition temperature of about 91° C. Another commercially available product that may be used in the present invention includes DERCOLYTE L120 sold by the company DRT of France. DERCOLYTE L120 polyterpene-limonene resin has a number average molecular weight of about 625, a weight average molecular weight of about 1010, an Ip of about 1.6, a softening point of about 119° C. and has a glass transition temperature of about 72° C. Still another commercially available terpene resin that may be used in the present invention includes SYLVARES TR 7125 and/or SYLVARES TR 5147 polylimonene resin sold by the Arizona Chemical Company of Jacksonville, Fla. SYLVARES 7125 polylimonene resin has a molecular weight of about 1090, has a softening point of about 125° C., and has a glass transition temperature of about 73° C. while the SYLVARES TR 5147 has a molecular weight of about 945, a softening point of about 120° C. and has a glass transition temperature of about 71° C.

Other suitable plasticizing hydrocarbon resins that are commercially available include $C_5$ cut/vinyl-aromatic styrene copolymer, notably $C_5$ cut/styrene or $C_5$ cut/$C_9$ cut from Neville Chemical Company under the names SUPER NEVTAC 78, SUPER NEVTAC 85 and SUPER NEVTAC 99; from Goodyear Chemicals under the name WINGTACK EXTRA; from Kolon under names HIKOREZ T1095 and HIKOREZ T1100; and from Exxon under names ESCOREZ 2101 and ECR 373.

Yet other suitable plasticizing hydrocarbon resins that are limonene/styrene copolymer resins that are commercially available include DERCOLYTE TS 105 from DRT of France; and from Arizona Chemical Company under the name ZT115LT and ZT5100.

It may be noted that the glass transition temperatures of plasticizing resins may be measured by Differential Scanning calorimetry (DCS) in accordance with ASTM D3418 (1999). In particular embodiments, useful resins may be have a glass transition temperature that is at least 25° C. or alternatively, at least 40° C. or at least 60° C. or between 25° C. and 95° C., between 40° C. and 85° C. or between 60° C. and 80° C.

The amount of plasticizing hydrocarbon resin useful in any particular embodiment of the present invention depends upon the particular circumstances and the desired result. In general, for example, the total amount of plasticizing resin added to complement the plasticizing liquid in the rubber composition may be between 5 phr and 125 phr or alternatively, between 30 phr and 120 phr or between 35 phr and 100 phr. In particular embodiments, the plasticizing resin may be present in an amount of between 40 phr and 80 phr, between 40 phr and 90 phr or between 35 phr and 90 phr of the plasticizing resin.

The ratio of the plasticizing resin to the plasticizing oil may be at any suitable amount to achieve the desired shear modulus or other desired characteristic but in particular embodiments may range, for example, between 1:5 and 5:1 or alternatively between 1:4 and 4:1 or between 1:2 and 2:1.

The rubber compositions disclosed herein are cured under an ultra-efficient sulfur curing system, which is a curing system having a sulfur to accelerator ratio by weight of between 0.02 and 0.2 or alternatively between 0.08 and 0.16, between 0.05 and 0.15, between 0.05 and 0.13 or between 0.02 and 0.15. In addition to the sulfur and the accelerants, the curing system may further include, for example, stearic acid and/or zinc oxide.

The sulfur may be provided either as free sulfur, through a sulfur donor or combinations thereof. Suitable free sulfur includes, for example, pulverized sulfur, rubber maker's sulfur, commercial sulfur, and insoluble sulfur. An example of a sulfur donor, as known in the art, is VANAX A and VANDEX, both provided by RT Vanderbilt Company of NY.

Accelerators are used to control the time and/or temperature required for vulcanization and to improve the properties of the cured rubber composition. Particular embodiments of the present invention include one or more accelerators examples of which include but are not limited to: thiazoles, sulphenamides, guanidines, thiourea derivatives, amine derivatives, and combinations thereof. These include, but are not limited to: benzothiazyl-2-cyclohexyl sulphenamide (CBS), benzothiazoyl-2-tert.-butyl sulphenamide (TBBS), 2-mercaptobenzothiazole (MBT), zinc or sodium salt of 2-mercaptobenzothiazole (ZMBT), benzothiazyl-2-sulphene morpholide (MBS), benzothiazyldicyclohexy-1 sulphenamide (DCBS), diphenyl guanidine (DPG), Triphenyl guanidine (TPG), diorthotolyl guanidine (DOTG), o-tolyl-bigaunide (OTBG), ethylene thiourea (ETU), diethylthiourea (DETU), diphenyl thiourea (DPTU), benzothiazole disulfide (MBTS), hexamethylene tetramine (HMT), ethylidene aniline (EA), and mixtures thereof. One example of a suitable primary accelerator useful in the present invention is a sulfenamide. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamid (MBS) and N'-dicyclohexyl-2-benzothiazolesulfenamide (DCBS). Combinations of accelerators are often useful to improve the properties of the cured rubber composition and the particular embodiments include the addition of secondary accelerators. Such accelerators may be added to the rubber composition in quantities, for example, of between 3 phr and 12 phr or alternatively, between 4 phr and 12 phr, between 5 phr and 10 phr. Of course the determinate amount of accelerators is set by the ratio of sulfur to accelerator as defined above and the amounts here and below are examples only and are not meant to limit the invention.

Combinations of accelerators are often useful to improve the properties of the cured rubber composition and the particular embodiments include the addition of secondary accelerators. Particular embodiments may include as a secondary accelerant the use of a moderately fast accelerator such as, for example, diphenylguanidine (DPG), triphenyl guanidine (TPG), diorthotolyl guanidine (DOTG), o-tolyl-bigaunide (OTBG) or hexamethylene tetramine (HMTA). Such accelerators may be added in an amount of up to 4 phr, between 0.5 and 3 phr, between 0.5 and 2.5 phr or between 1 and 2 phr. Particular embodiments may exclude the use of fast accelerators and/or ultra-fast accelerators such as, for example, the fast accelerators: disulfides and benzothiazoles; and the ultra-accelerators: thiurams, xanthates, dithiocarbamates and dithiophosphates.

The ultra-efficient vulcanization system is used to maintain the elongation to shear modulus ratio of MA300:G*60 of the cured rubber composition disclosed herein to be 1.7 or greater or alternatively to be between at least 1.7 and 3 or between 1.9 and 2.5. As noted above, the elongation to shear modulus ratio is the ratio of the elongation modulus MA300 at 300% measured at 23° C. and the shear modulus G*60 measured at 60° C. By adjusting the vulcanization system to maintain the elongation to shear modulus ratio within the defined parameters, the surprisingly good material cohesion properties can be achieved. Decreasing the S to Accelerator ratio results in an increase in the moduli ratio.

Other additives can be added to the rubber compositions disclosed herein as known in the art. Such additives may include, for example, some or all of the following: antidegradants, antioxidants, fatty acids, waxes, stearic acid and zinc oxide. Examples of antidegradants and antioxidants include 6PPD, 77PD, IPPD and TMQ and may be added to rubber compositions in an amount, for example, of from 0.5 phr and 5 phr. Zinc oxide may be added in an amount, for example, of between 1 phr and 6 phr or alternatively, of between 1.5 phr and 4 phr. Waxes may be added in an amount, for example, of between 1 phr and 5 phr.

The rubber compositions that are embodiments of the present invention may be produced in suitable mixers, in a manner known to those having ordinary skill in the art, typically using two successive preparation phases, a first phase of thermo-mechanical working at high temperature, followed by a second phase of mechanical working at lower temperature.

The first phase of thermo-mechanical working (sometimes referred to as "non-productive" phase) is intended to mix thoroughly, by kneading, the various ingredients of the composition, with the exception of the vulcanization system. It is carried out in a suitable kneading device, such as an internal mixer or an extruder, until, under the action of the mechanical working and the high shearing imposed on the mixture, a maximum temperature generally between 120° C. and 190° C., more narrowly between 130° C. and 170° C., is reached.

After cooling of the mixture, a second phase of mechanical working is implemented at a lower temperature. Sometimes referred to as "productive" phase, this finishing phase consists of incorporating by mixing the vulcanization (or cross-linking) system (sulfur or other vulcanizing agent and accelerator(s)), in a suitable device, for example an open mill. It is performed for an appropriate time (typically between 1 and 30 minutes, for example between 2 and 10 minutes) and at a sufficiently low temperature lower than the vulcanization temperature of the mixture, so as to protect against premature vulcanization.

The rubber composition can be formed into useful articles, including treads for use on vehicle tires. The treads may be formed as tread bands and then later made a part of a tire or they be formed directly onto a tire carcass by, for example, extrusion and then cured in a mold. As such, tread bands may be cured before being disposed on a tire carcass or they may be cured after being disposed on the tire carcass. Typically a tire tread is cured in a known manner in a mold that molds the tread elements into the tread, including, e.g., the sipes molded into the tread blocks.

It is recognized that treads may be formed from only one rubber composition or in two or more layers of differing rubber compositions, e.g., a cap and base construction. In a cap and base construction, the cap portion of the tread is made of one rubber composition that is designed for contact with the road. The cap is supported on the base portion of the tread, the base portion made of a different rubber composition. In particular embodiments of the present invention the entire tread may be made from the rubber compositions as disclosed herein while in other embodiments only the cap portions of the tread may be made from such rubber compositions.

It is recognized that the contact surface of a tread block, i.e., that portion of the tread block that contacts the road, may be formed totally from the rubber composition having the low Tg as disclosed herein, may be formed totally from another rubber composition or may be formed as combinations thereof. For example, a tread block may be formed as a composite of layered rubber compositions such that half of the block laterally is a layer of the low Tg rubber composition and the other half of the block laterally is a layer of an alternative rubber composition. Such construction would provide a tread block having 80 percent of its contact surface formed of the low Tg rubber composition.

As such, in particular embodiments of the present invention, at least 80 percent of the total contact surface of all the tread blocks on a tread may be formed from the rubber composition having the low Tg as disclosed herein. Alternatively, at least 90 percent, at least 95 percent or 100 percent of the total contact surface of all the tread blocks on a tread may be formed from such rubber composition.

While the tire treads disclosed herein are suitable for many types of vehicles, particular embodiments include tire treads for use on vehicles such as passenger cars and/or light trucks. Such tire treads are also useful for all weather tires and/or summer tires. Particular embodiments may also include snow or winter tires. As such, the properties of the cured rubber compositions from which the treads disclosed herein may be manufactured may have a glass transition temperature of between −20° C. and 0° C. and/or alternatively, between −20° C. and −10° C., between −20° C. and 0° C., between −15° C. and −5° C., between −30° C. and −15° C., between −35° C. and −10° C. or between −35° C. and 0° C.

The invention is further illustrated by the following examples, which are to be regarded only as illustrations and not delimitative of the invention in any way. The properties of the compositions disclosed in the examples were evaluated as described below and these utilized methods are suitable for measurement of the claimed properties of the present invention.

The invention is further illustrated by the following examples, which are to be regarded only as illustrations and not delimitative of the invention in any way.

Moduli of elongation (MPa) were measured at 10% (MA10), 100% (MA100) and 300% (MA300) at a temperature of 23° C. based on ASTM Standard D412 on dumbbell test pieces. The measurements were taken in the second elongation; i.e., after an accommodation cycle. These measurements are secant moduli in MPa, based on the original cross section of the test piece.

The elongation property was measured as elongation at break (%) and the corresponding elongation stress (MPa), which was measured at 23° C. in accordance with ASTM Standard D412 on ASTM C test pieces.

Dynamic properties (Tg and G*) for the rubber compositions were measured on a Metravib Model VA400 ViscoAnalyzer Test System in accordance with ASTM D5992-96. The response of a sample of vulcanized material (double shear geometry with each of the two 10 mm diameter cylindrical samples being 2 mm thick) was recorded as it was being subjected to an alternating single sinusoidal shearing stress of a constant 0.7 MPa and at a frequency of 10 Hz over a temperature sweep from −60° C. to 100° C. with the temperature increasing at a rate of 1.5° C./min. The shear modulus G* at 60° C. was captured and the temperature at which the max tan delta occurred was recorded as the glass transition temperature, Tg.

Dry handling performance for tires mounted on an automobile are assessed while traveling round a dry circuit comprising numerous bends at a maximum speed. The time taken to cover each lap of the circuit is recorded and averaged to provide an average lap time for the test. The lower the average lap time, the better the dry handling performance. The results are then normalized to a witness, the witness being 100. A normalized result less than 100 indicates improved dry handling.

Wear on the dry handling course was determined by weighing the tire before the test and after the test, the difference being the wear. The results are then normalized to a witness, the witness being 100. A normalized result less than 100 indicates improved wear, i.e., less wear from the tire. For some tests, a starting weight of the tire was not obtained and the results were subjective, obtained by observation by one skilled in the art. Such skilled observers can easily distinguish large deviations in the degree of chunking on a tire and more detailed or quantified analysis is not required.

Example 1

Rubber compositions were prepared using the components shown in Table 1. The amount of each component making up the rubber compositions shown in Table 1 are provided in parts per hundred parts of rubber by weight (phr).

TABLE 1

Rubber Formulations

| Formulations | W1 | F1 | W2 | F2 | F3 | W3 | F4 |
|---|---|---|---|---|---|---|---|
| BR | 36 | 36 | | | | 100 | 100 |
| SBR | 70.4 | 70.4 | 100 | 100 | 100 | | |
| Carbon Black, N234 | 10 | 10 | | | | 9 | 9 |
| Silica | 130 | 130 | 147 | 147 | 129 | 107 | 97 |
| Plasticizing Oil | 43 | 36 | 40 | 46 | 37 | 34 | 32 |
| Polyterpene Resin | 20 | 30 | 44 | 46 | 46 | 40 | 41 |
| Silane Coupling Agent | 9.75 | 9.75 | 11.7 | 11.7 | 10.35 | 8.56 | 8.56 |
| Accelerator | 4.4 | 8.9 | 4.38 | 7.5 | 7.5 | 3.8 | 5.6 |
| Sulfur | 1.2 | 0.5 | .83 | .83 | .83 | .83 | .83 |
| S/Accelerator Ratio | 0.27 | 0.056 | 0.19 | 0.11 | 0.11 | 0.22 | 0.15 |
| Remaining Cure Package | 4 | 4 | 3.25 | 3.25 | 3.25 | 3.5 | 3.5 |
| Additives | 3.4 | 3.4 | 3.4 | 3.4 | 3.4 | 3.4 | 3.4 |

The terpene resin was SYLVARES TR-5147, a polylimonene resin available from Arizona Chemical, Savannah, Ga. The plasticizing oil was AGRI-PURE 80. The silica was ZEOSIL 160, a highly dispersible silica available from Rhodia having a BET of 160 m$^2$/g. The silane coupling agent was X 50-S available from Evonik Degussa. The curative package included sulfur, accelerators, zinc oxide and stearic acid. The accelerators were a combination of DPG and CBS and the additives includes antidegradants and wax.

TABLE 2

Test Results

| Formulations | W1 | F1 | W2 | F2 | F3 | W3 | F4 |
|---|---|---|---|---|---|---|---|
| Physical Properties | | | | | | | |
| Shear Modulus G* @ 60° C. | 1.0 | 1.3 | 1.06 | 0.96 | 1.02 | 0.64 | 0.71 |
| Tg, ° C. | −23 | −16 | −22 | −22 | −21 | −31.3 | −31.5 |
| MA100 @ 23° C., MPa | 1.7 | 2.4 | 1.6 | 1.8 | 2 | 0.8 | 1.3 |
| MA300 @ 23° C., MPa | 1.4 | 2.6 | 1.2 | 1.9 | 2.3 | 0.7 | 1.8 |
| MA300/G* Ratio | 1.4 | 2 | 1.1 | 2 | 2.3 | 1.1 | 2.5 |

TABLE 2-continued

Test Results

| Formulations | W1 | F1 | W2 | F2 | F3 | W3 | F4 |
|---|---|---|---|---|---|---|---|
| Tire Tests | | | | | | | |
| Wear, total mass loss g | 100 | 56 | a | b | c | d | e |
| Dry Handling, lap times | 100 | 100 | 100* | 99 | 99 | 100 | 100 |

*Test ended early due to tire being destroyed by chunking.
a The dry handling test was not completed due to the chunking but the average for the time completed was set as the normal.
b & c The wear was much improved over the witness W2 and c was much better than b.
d The dry handling test was completed but the tires had severe chunking
e The tire condition at the end of the test was much better than d.

The rubber formulations were prepared by mixing the components given in Table 1, except for the sulfur and the accelerators, in a Banbury mixer operating between 25 and 65 RPM until a temperature of between 130° C. and 170° C. was reached. The accelerators and sulfur were added in the second phase on a mill. Vulcanization was effected at 150° C. for 40 minutes. The formulations were then tested to measure their physical properties, the results of which are shown in Table 2.

As can be seen in the tire results for Table 2, the dry handling characteristics of the tire remained high for each of the formulations. However, it should be noted that formulations F1-F3 all demonstrated significantly improved material cohesion properties over the witnesses. In fact, the tire tread manufactured from the W2 formulation chunked so badly due to poor material cohesion that it could not finish the dry handling test.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A tread for a tire, the tread comprising a rubber composition that is based upon a cross-linkable elastomer composition, the cross-linkable elastomer composition comprising, per 100 parts by weight of rubber (phr):
    a highly unsaturated diene elastomer;
    between 95 phr and 160 phr of an inorganic reinforcing filler;
    between 60 phr and 130 phr of a plasticizing system comprising a plasticizing resin having a Tg of at least 25° C. and a plasticizing liquid;
    an ultra-efficient sulfur curing system having a sulfur to accelerator weight ratio adjusted between 0.02 and 0.2 to provide the rubber composition with an MA300/G* ratio of greater than 1.7, wherein the elongation modulus MA300 at 300% is measured at 23° C. and the shear modulus G* is measured at 60° C.

2. The tread of claim 1, wherein the rubber composition has a glass transition temperature of between −35° C. and 0° C.

3. The tread of claim 1, wherein the sulfur to accelerator weight ratio is between 0.05 and 0.15.

4. The tread of claim 1, wherein the MA300/G* ratio is between 1.7 and 3.

5. The tread of claim 1, wherein the shear modulus G* at 60° C. is between 0.4 MPa and 1.4 MPa.

6. The tread of claim 1, wherein the shear modulus G* at 60° C. is between 0.5 MPa and 1 MPa.

7. The tread of claim 1, wherein the inorganic reinforcing filler is a highly dispersible silica.

8. The tread of claim 1, wherein a ratio of the plasticizing resin to the plasticizing liquid is between 4:1 and 1:4.

9. The tread of claim 1, wherein a ratio of the plasticizing resin to the plasticizing liquid is between 2:1 and 1:2.

10. The tread of claim 1, wherein the plasticizing resin has a glass transition temperature of between 40° C. and 85° C.

11. The tread of claim 10, wherein the plasticizing resin is a polylimonene resin.

12. The tread of claim 1, wherein the plasticizing liquid is selected from sunflower oil, soybean oil, safflower oil, corn oil, linseed oil, cotton seed oil or combinations thereof.

13. The tread of claim 12, wherein the plasticizing liquid has an oleic content of at least 80 wt. %.

14. The tread of claim 1, wherein the plasticizing system comprises between 5 phr and 70 phr of the plasticizing liquid.

15. The tread of claim 1, wherein the plasticizing system comprises between 5 phr and 125 phr of the plasticizing resin.

* * * * *